United States Patent [19]

Kovach

[11] 4,108,703

[45] Aug. 22, 1978

[54] METHOD AND APPARATUS FOR PRODUCING DOUBLE-WALLED THERMOPLASTIC PIPE

[76] Inventor: Leslie J. Kovach, 880 Fifth Ave., New York, N.Y. 10021

[21] Appl. No.: 798,867

[22] Filed: May 20, 1977

[51] Int. Cl.² .................... B29C 15/00; B29D 23/04
[52] U.S. Cl. ................. 156/244.13; 156/285; 156/290; 156/293; 156/294; 156/500; 264/286; 425/133.1; 425/336; 425/396
[58] Field of Search ............... 156/244, 290, 293, 294, 156/205, 462, 472; 264/151, 286; 138/121, 122; 425/133.1, 303, 336, 328, 329, 396, 517

[56] References Cited

U.S. PATENT DOCUMENTS

| | | | |
|---|---|---|---|
| 3,327,039 | 6/1967 | Rückert et al. ................. | 264/286 |
| 3,692,889 | 9/1972 | Hetrich ............................ | 425/396 |
| 3,994,644 | 11/1976 | Hegler et al. .................... | 156/244 |
| 3,994,646 | 11/1976 | Hauck .............................. | 425/133.1 |

FOREIGN PATENT DOCUMENTS 849,916  9/1960  United Kingdom ............... 264/286

Primary Examiner—Caleb Weston
Attorney, Agent, or Firm—Cooper, Dunham, Clark, Griffin & Moran

[57] ABSTRACT

A double-walled pipe of thermoplastic material is produced, constituted of an inner pipe and an outer pipe concentric therewith, in which the outer pipe is formed into the shape of a helical thread. The pipes are extruded, the outer over the inner, and prior to the setting of the outer pipe it is subjected to forming into a helical thread by a rotating mold. The mold includes vacuum forming rollers spaced along a helical path about the outer pipe, the circumferential edges of the rollers being spaced at different distances from the longitudinal axis of the pipes.

16 Claims, 5 Drawing Figures

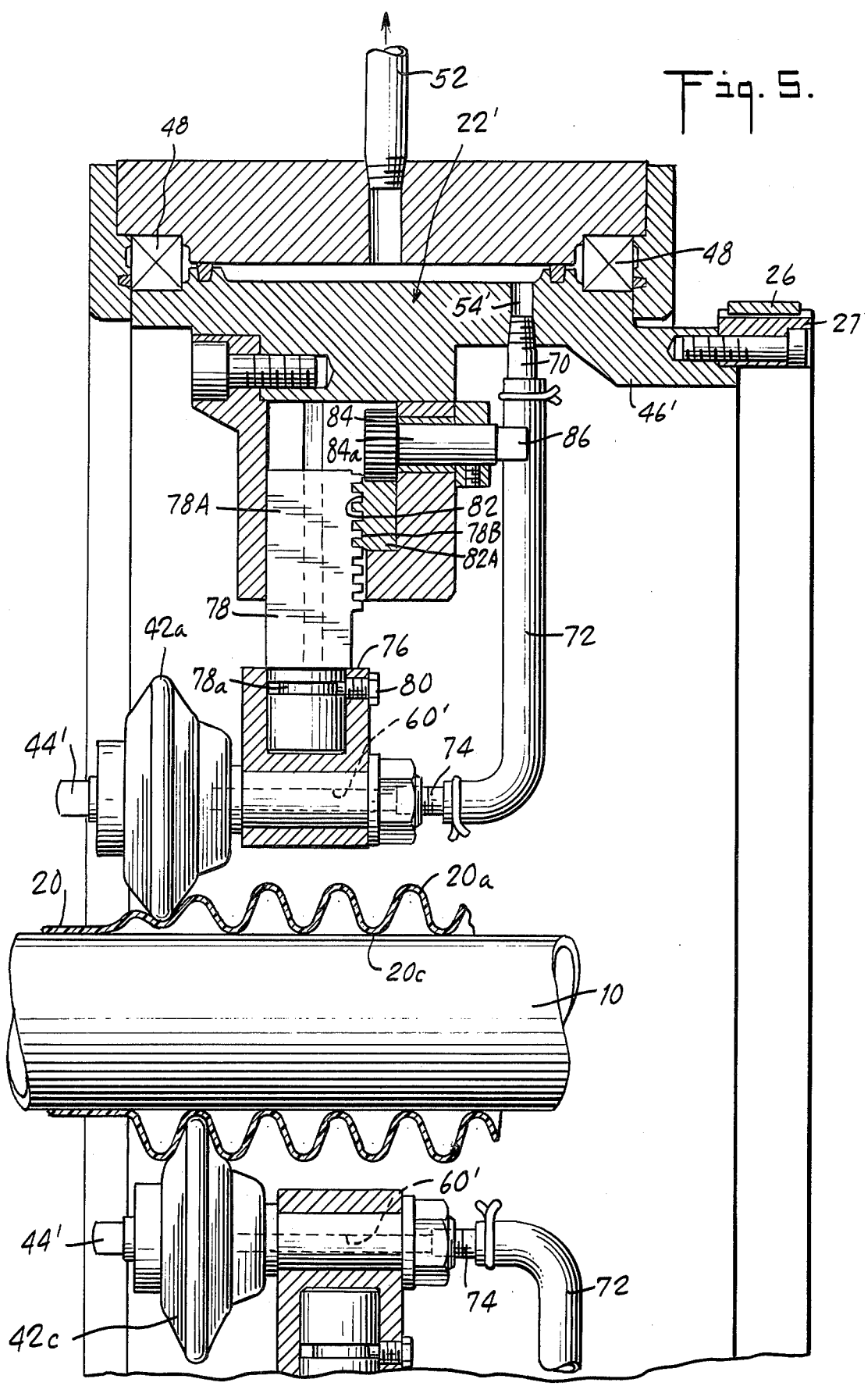

METHOD AND APPARATUS FOR PRODUCING DOUBLE-WALLED THERMOPLASTIC PIPE

BACKGROUND AND BRIEF DESCRIPTION OF THE INVENTION

This invention relates to the production of double-walled thermoplastic pipe. The invention provides for the production of such pipe, formed from concentric outer and inner pipes, in which the outer pipe is molded into the shape of a helical thread.

The invention finds particular application to the production of double-walled thermoplastic sewer pipe, in which the inner pipe is cylindrical and smooth-walled to provide for the passage of sewege effluent therethrough, with the outer pipe being corrugated for strength. The conventional way of making such pipe is by utilizing a series of split molds carried by continuous chains, the split molds coming together about the outer pipe to form corrugations therein. An example of this type of technology is given by the following U.S. patents:

| U.S. Pat. No. | Date | Patentee |
| --- | --- | --- |
| 3,924,992 | 9 December 1975 | Hegler |
| 3,976,414 | 24 August 1976 | Hegler et al |
| 3,751,541 | 7 August 1973 | Hegler |
| 3,677,676 | 18 July 1972 | Hegler |
| 3,538,209 | 3 November 1970 | Hegler |
| 3,994,644 | 30 November 1976 | Hegler |
| 3,776,679 | 4 December 1973 | Hegler |

The use of split molds involves elaborate machinery, and requires an exact matching of mold halves in order to avoid noticeable seams in the pipe and properly to form the corrugations.

It is also known to feed a strip of thermoplastic material on the outer surface of a thermoplastic pipe to form a helical thread thereon. See the following German publication: "Erfahrungen beim Herstellen von Grobrohren aus PVC hart", by Von Ing. H.-W. Selbach, Bad Oeynhausen.

This separate feeding of strip also involves cumbersome machinery, as is apparent from the publication.

In the present invention, a double-walled pipe of thermoplastic material is produced by forming an outer pipe over and concentric with an inner pipe. The two pipes are then passed through a mold which rotates about the longitudinal axis of the pipes and which acts upon the outer pipe so as to form it into the shape of a helical thread about the outer surface of the inner pipe. The helical thread is formed so that the root section thereof is bonded to the outer surface of the inner pipe, advantageously through the use of rotating rollers spaced about the outer pipe along a helical path. A vacuum is applied to the outer pipe through the rollers to aid in the formation of the helical thread. Preferably, the circumferential edges of the rollers are spaced different distances from the longitudinal axis of the pipes to enhance the thread forming operation. The use of a rotating thread-forming mold greatly facilitates the helical thread forming operation and is capable of being carried out with relatively simple machinery. The exact matching of mold halves and the providing of extensive production line facilities as in the Hegler patent approach is not required.

The use of rotating molds to provide helical corrugations is not, in and of itself, novel. Such rotating mold assemblies have, however, in the past been limited to use upon individual pipe. The use of such rotating mold assemblies has not been suggested for double-walled thermoplastic pipe. Examples of the use of rotating molds for corrugation forming purposes in single-walled pipe is given by the following patents:

| U.S. Pat. No. | Date | Patentee |
| --- | --- | --- |
| 3,529,047 | 15 September 1970 | Yoshida et al |
| 3,692,889 | 19 September 1972 | Hetrich |
| 4,017,244 | 12 April 1977 | Vellani |

The invention will be more completely understood by reference to the following detailed description.

BRIEF DESCRIPTION OF THE DRAWING

FIG. 4 is an end view, to a reduced scale, of the rotating mold shown in FIG. 3, looking in the direction of the arrows 4—4 in FIG. 3.

FIG. 5 is a sectional view, in side elevation, similar to that shown in FIG. 4 showing the details of another form of rotating mold to form a helical thread.

DETAILED DESCRIPTION

Figure 1:
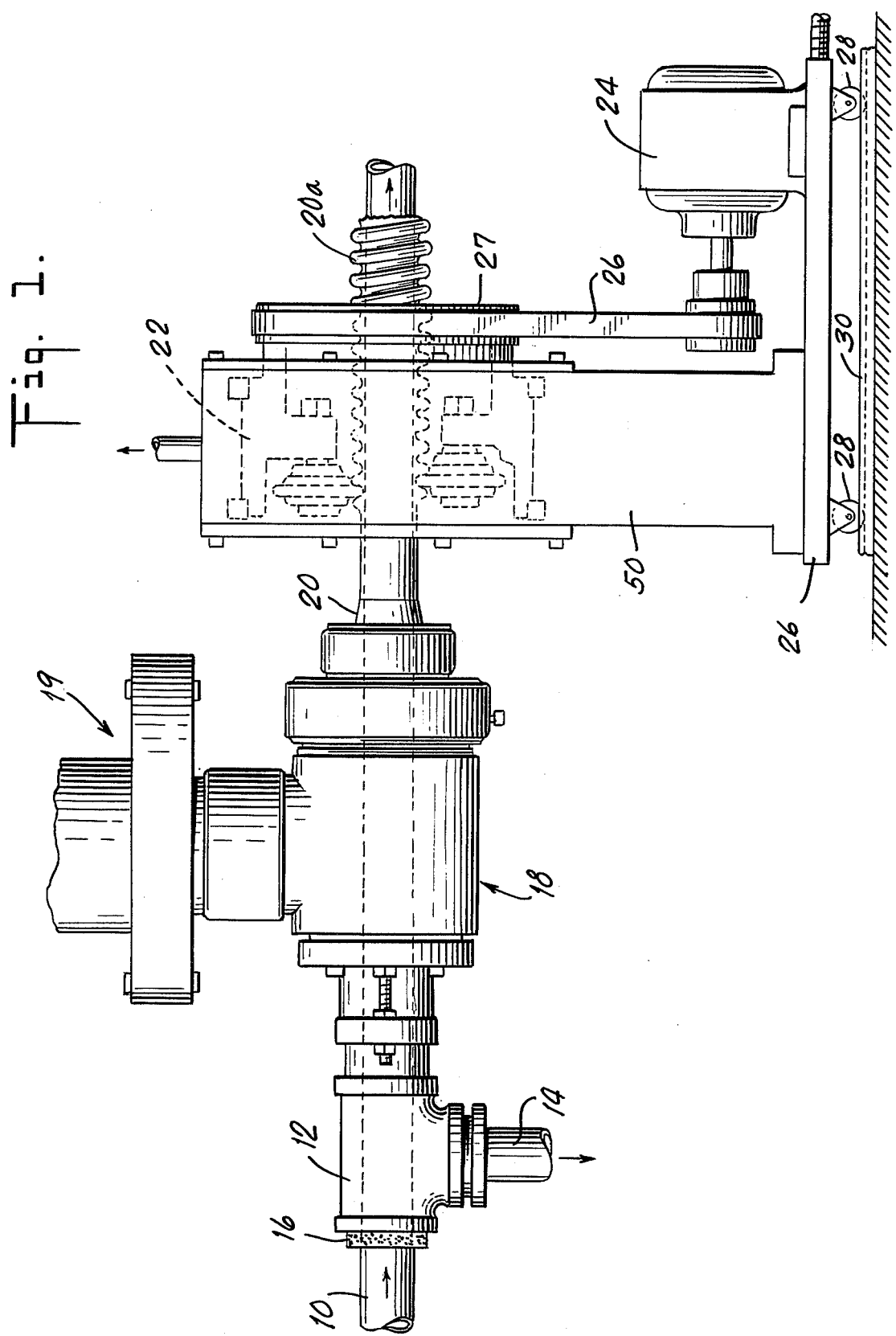
FIG. 1 is a side elevational view of apparatus presently preferred and embodying the invention.

Referring to FIG. 1, thermoplastic pipe 10 is typically extruded from a conventional pipe extruder (not shown). The pipe 10 is cylindrical and contains a smooth inner wall for the appropriate handling of liquid, e.g., sewege effluent. The pipe may be any typical thermoplastic material, such as polyvinyl chloride and copolymers and polyethylene, as well as polystyrene and copolymers, to name some examples. The pipe 10 is solid and set, but is fairly workable or malleable. In the case of polyethylene, e.g., the pipe 10 might be in the range 125° to 175° F., while for polyvinyl chloride it might be in the range 150° to 190° F. The pipe is typically three inches or greater in outside diameter, with a wall thickness of generally greater than 1/16 inch.

The pipe 10 passes through a coupling 12 which is connected to a vacuum pump (not shown) via a vacuum line 14. The vacuum line is for the removal of trapped air, to be explained in more detail below. The coupling 12 may advantageously include a seal 16 of soft rubber or other suitable material to preserve the vacuum within the coupling, and to wipe away moisture from pipe 10 due to prior water cooling.

From the coupling 12, the pipe passes through a conventional crosshead 18 which is connected to a conventional extruder 19 which extrudes an outer pipe 20 over the other, inner pipe 10. The outer pipe 20 makes first contact with the inner pipe 10 downstream of the crosshead 18, as will be explained in more detail below, and together the two pipes are acted upon within rotating mold assembly 22. That assembly acts to form or shape the outer tube 20 into a helical thread 20a about the outer surface of the inner pipe 10. The rotating mold assembly 22 is rotated about the longitudinal axis of the inner pipe 10 and outer pipe 20 by means of motor 24, drive belt 26 and pulley 27. The rotating mold assembly 22 is carried as an assembly by a carriage 26 mounted for movement in the direction of the longitudinal axis of the inner and outer pipes by means of rollers 28 that ride upon track 30. In this fashion, the downstream spacing of the rotating mold 22 and the crosshead 18 may be varied to ensure that pipe 20 is of the proper temperature to be acted upon by the rotating mold assembly 22.

The threaded double-walled pipe is moved through the various components of the system shown in FIG. 1 by a conventional pipe puller unit (not shown), which may be of the belt caterpillar type, e.g.

Figure 2:
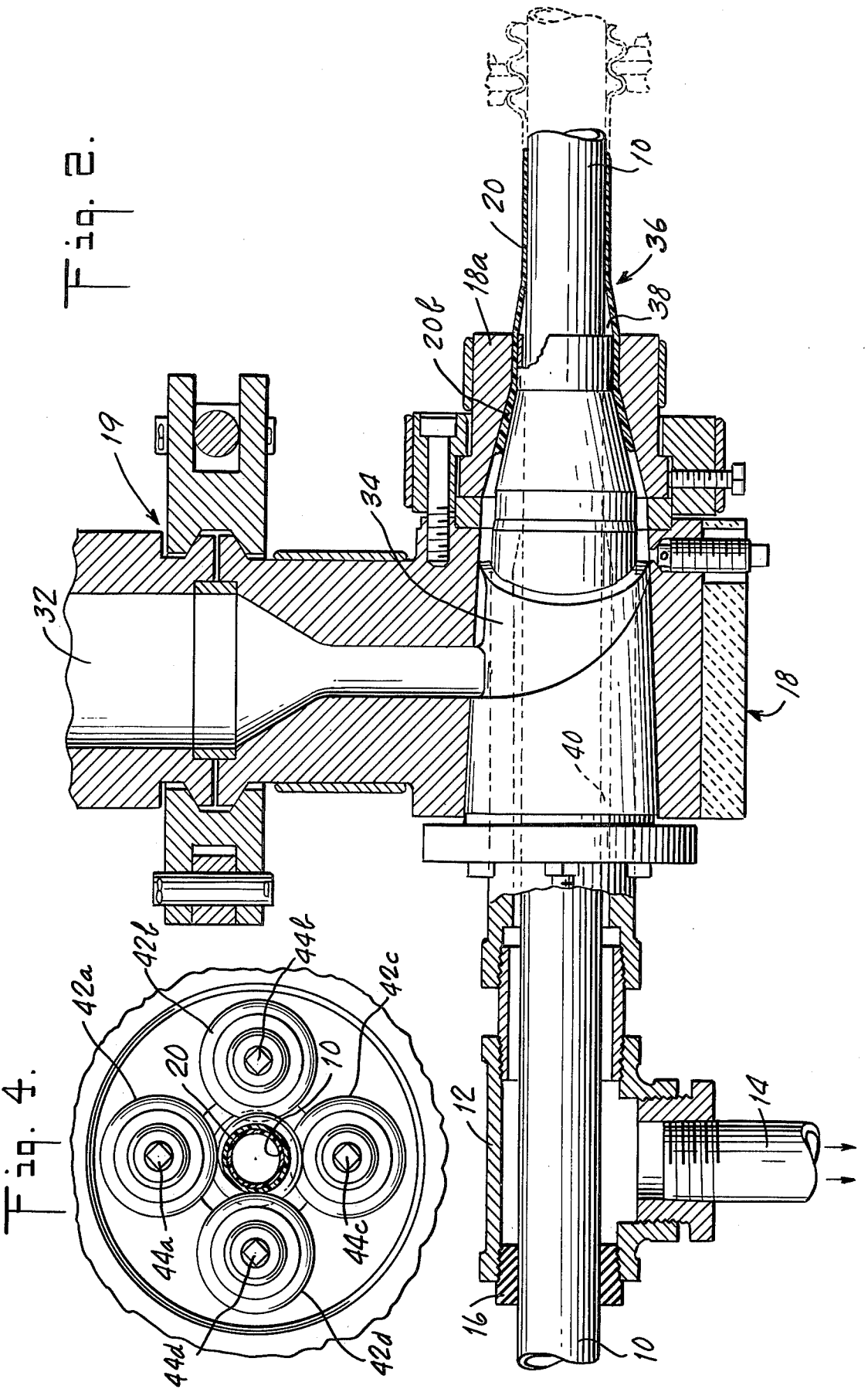
FIGS. 2 and 3 are sectional views, to an enlarged scale, also in side elevation of the principal parts of the apparatus of FIG. 1, respectively constituting the crosshead assembly and rotating mold shown in FIG. 1.
Figure 3:
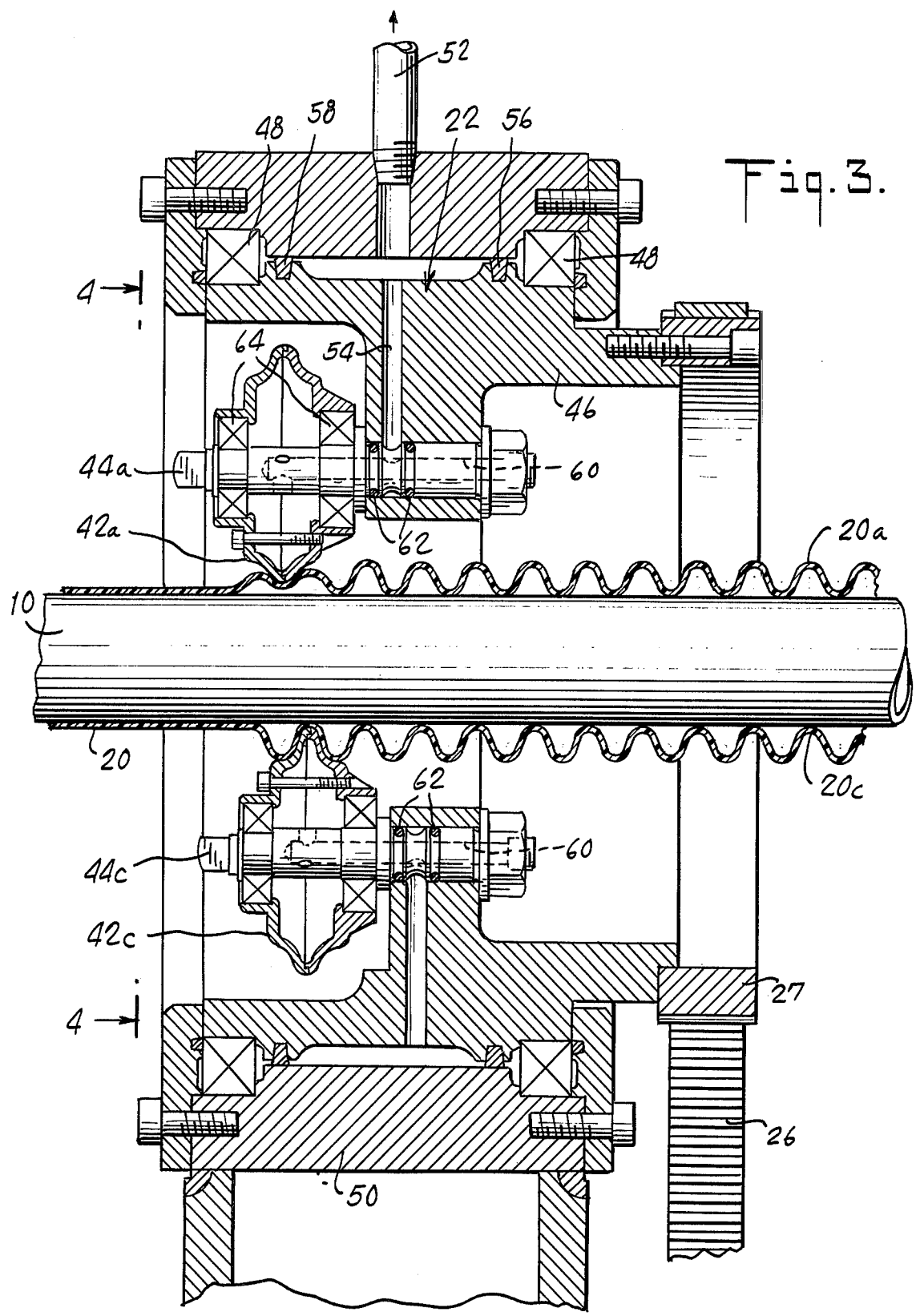

To explain in more detail the system shown in FIG. 1, reference should now be made to FIGS. 2 and 3. As noted above, the pipe 10 passes through the coupling 12 and into the crosshead 18. Within the extruder 19, fluid thermoplastic material is supplied thereto through passageway 32 and transformed from a stream of solid cross-section to one of annular cross-section by conventional extrusion guide 34. The annular stream of fluid thermoplastic material, designated 20b in FIG. 2, is extruded from the crosshead 18 from the output die 18a. It will be noted from FIG. 2, that the fluid stream of thermoplastic material makes first contact with the inner pipe 10 at a location 36 downstream from the outer face of the crosshead output die 18a. There is thus a gap 38 between the outer extruded material 20 and the inner pipe 10. This gap 38 communicates with passageway 40 within the crosshead 18 via the outer surface of the inner pipe 10, which in turn communicates with the vacuum line 14. The vacuum line, which is subjected to a pressure of less than ½ inch of mercury, e.g., exhausts whatever trapped air may be present between the inner pipe 10 and the extruded outer pipe 20 within the gap 38.

At the location 36 where the outer extruded thermoplastic material first meets the inner thermoplastic pipe 10, the temperature of the inner pipe is typically less than that of the outer layer. It is important that the two materials not be of such high temperature, and particularly that the outer material 20 not be so fluid, that the two pipes bond together at the location 36. It is for this reason that the outer layer of thermoplastic material is deposited upon the inner pipe 10 outside the crosshead 18, so that the internal extrusion pressure will not cause a bonding of the two pipes as would be the case if the contact took place within the crosshead.

The thickness of the outer layer 20 may be approximately ¼ the thickness of the inner pipe 10, although this relationship of thicknesses is simply representative. The outer layer 20 of thermoplastic material is acted upon by the rotating mold 22 shown in FIG. 3 to form that layer into the shape of a helical thread. The temperature of the outer layer 20 as it is acted upon within the rotating mold 22 may be varied by varying the downstream spacing of that rotating mold from the crosshead 18, as noted above, by virtue of the mounting of the entire assembly for movement along the track 30 (FIG. 1). The rotating mold 22 preferably comprises a plurality of rollers 42a, 42b, 42c and 42d. The number of rollers actually employed is arbitrary. As shown in FIGS. 3 and 4, the rollers 42 are spaced about the outer pipe 20 along a helical path. Each of the rollers is rotatable about an individual spindle (44a-44d) mounted upon a carrier element 46. The pulley 27 is connected to the carrier element 46; that carrier is rotatably journalled by bearings 48 in housing 50. The housing 50 is mounted upon the carriage 26 as shown in FIG. 1.

A vacuum line 52 is connected to the housing 50 and communicates with passageway 54 in the carrier element 46. To this end, O-ring seals 56 and 58 serve to preserve the vacuum within the passageway 54 by forming appropriate vacuum seals between the rotating carrier element 46 and the stationary housing 50. The passageway 54 in the carrier element 46 communicates with vacuum passages 60 in the spindles 44. O-rings 62 preserve the vacuum seal. Each of the spindle passageways opens into the interior of the corresponding roller 42 which either is perforated along its outer circumference or is made of porous sintered metal so that air can pass through the roller. In this fashion the vacuum from the vacuum line 52 is applied through the rollers to the outer pipe 20.

As noted above, the rollers 42 are mounted along a helical path about the outer pipe 20. The circumferential edges of the rollers are spaced at different distances from the longitudinal axis of the pipes 10 and 20. As shown in FIG. 3, the first of the forming rollers 42a (first encountered by the pipes as they move downstream) is spaced the greatest radial distance from the longitudinal axis of the thermoplastic pipes. The next roller, 42b, is spaced the next greatest distance and so on to the roller 42d which is spaced the closest to the longitudinal axis. In this fashion, the helical thread that is formed with the outer pipe 20 is formed in a gradual fashion. It should be noted that the final two rollers in the helical progression, i.e., 42c and 42d firmly press the root section 20c of the helical thread firmly against the outer surface of the inner pipe 10. In this fashion, the root section 20c is firmly bonded to that outer surface of the inner pipe. To ensure a complete bonding process, the rollers 42a may be heated, if necessary. In any event, by virtue of the shape of the rollers 42 and the vacuum that is applied thereto, the thermoplastic material of the outer pipe 20 is vacuum-drawn so that it conforms in shape to the rollers to aid in the forming of a helical thread. Each of the forming rollers 42 is free to rotate about the associated spindle (by virtue of bearings 64) thereby ensuring that the forming rollers 42 do not adhere to the outer thereomoplastic pipe 20. Further, by rotation of the carrier element 46, in synchronism with the movement of the outer and inner thermoplastic pipes in the direction of their longitudinal axis, those pipes are free to move through the rotating mold assembly as the outer pipe 20 is shaped into a helical thread.

FIG. 5 shows an alternative form of rotating mold assembly 22'. This assembly is arranged for variation of the radial separation between the vacuum forming rollers 42 and the longitudinal axis of the thermoplastic pipes, to be able to accommodate pipes of varying diameters. The same reference numerals have been used in FIGS. 5 and 3 to designate like components. In FIG. 5, the carrier element 46' includes vacuum passageway 54' which is connected by appropriate nipples 70 to flexible vacuum pipes 72. Each of the vacuum pipes is connected by way of nipple 74 threaded into the end of the associated one of spindles 44' to vacuum passageway 60' in the spindle. Each of the spindles is mounted by mounting member 76 to spindle extension 78. The spindle extension is grooved, as at 78a, and the end of a bolt 80 threaded through the support member 76 is positioned within the groove 78a. Thus the support member 76 is held on the end of the spindle extension 78 and may be pivoted to any desired orientation so that the associated forming roller 42 is aligned properly to conform with the helix angle of the threaded outer pipe 20. Tightening of the bolt 80 maintains the forming roller in this position.

Adjustment of all four forming rollers 42 radially outwardly or inwardly is achieved by the mounting of the spindle extensions 78. In particular, each of these spindle extensions forms a part of rod 78A which includes teeth 78B on one face thereof. The teeth are in the form of a spiral thread which engage a corresponding spiral thread 82 of an annular adjustment gear 82A. The adjustment gear 82A is driven by gear 84, the adjustment of which is varied by suitable pivoting of knob 86 forming an extension of gear shaft 84a. By suitable rotational adjustment of the knob 86, the gear 84, acting through the gear 82A, causes the rod 78A to move so that the spindles 78 move radially inwardly or outwardly with respect to the longitudinal axis of the thermoplastic pipes 10 and 20. The adjustment action is similar to that in a universal three-jaw ajustable chuck for a lathe.

It will be appreciated that, with the apparatus described above, it is possible to produce double-walled thermoplastic pipe in which the outer pipe is shaped in the form of a helical thread, with the root portion thereof bonded to the outer surface of the inner pipe, through use of a non-cumbersome rotating mold assembly which forms the thread. The elaborate and complicated mating mold half approach taken in the Hegler patents is completely avoided. Problems of matching mold halves are obviated, and the mechanism is easily adjusted to accommodate thermoplastic pipe of varying materials and sizes.

The representative but presently preferred embodiments described above are susceptible of modification by those skilled in the art. Accordingly, the invention should be taken to be defined by the following claims.

I claim:

1. A method of producing a double-walled pipe of thermoplastic material comprising forming an outer pipe of thermoplastic material over and concentric with an inner pipe of thermoplastic material, and passing said outer and inner pipes through an assembly which rotates about the longitudinal axis of said pipes and which carries a plurality of freely rotatable forming rollers positioned in a helical path about said pipes, which rollers act by vacuum upon the outer surface of the outer pipe so as to form it into the shape of a helical thread about the outer surface of said inner pipe.

2. A method according to claim 1, in which said inner pipe is cylindrical, and said helical thread is formed by said rotating mold with a root section thereof bonded to the outer surface of said inner pipe.

3. A method according to claim 2, in which said outer pipe is extruded over said inner pipe, trapped air is exhausted from between said inner and outer pipes, and said helical thread is formed prior to the setting of said outer pipe.

4. A method according to claim 3, in which said inner pipe is first extruded, followed by said extrusion of said outer pipe thereover.

5. Apparatus for producing a double-walled pipe of thermoplastic material comprising means for forming an outer pipe of thermoplastic material over and concentric with an inner pipe of thermoplastic material, and mold means rotating about the longitudinal axis of said pipes for forming said outer pipe into the shape of a helical thread about the outer surface of said inner pipe, in which said mold means comprises a plurality of rollers spaced about said outer pipe along a helical path, and including means for applying a vacuum to said outer pipe through said rollers.

6. Apparatus according to claim 5, in which said inner pipe is cylindrical, and said mold means bonds a root section of said helical thread to the outer surface of said inner pipe.

7. Apparatus according to claim 5, in which said rollers are each rotatable about an individual axis, all of said rollers being carried by a carrier which undergoes rotation about said longitudinal axis.

8. Apparatus according to claim 5, in which the circumferential edges of said rollers are spaced at different distances from the longitudinal axis of said pipes.

9. Apparatus according to claim 8, in which said rollers are spaced by decreasing distances from said longitudinal axis proceeding downstream along said helical thread.

10. Apparatus according to claim 5, wherein said means for forming said outer pipe over and concentric with said inner pipe includes means for extruding said outer pipe over said inner pipe, said extrusion means including an output die downstream of which said outer pipe comes in contact with said inner pipe.

11. Apparatus according to claim 10, in which said mold means is located downstream of said location at which said extruded outer pipe makes contact with said inner pipe, and means for varying the downstream spacing of said mold means from said output die.

12. Apparatus according to claim 10, including means for exhausting trapped air between said inner and outer pipes downstream of said output die.

13. Apparatus for producing a double-walled pipe of thermoplastic material comprising means for forming an outer pipe of thermoplastic material over and concentric with an inner pipe of thermoplastic material, and mold means rotating about the longitudinal axis of said pipes for forming said outer pipe into the shape of a helical thread about the outer surface of said inner pipe, in which said inner pipe is cylindrical, said mold means comprising a plurality of rollers spaced about said outer pipe along a helical path, means for applying a vacuum to said outer pipe through said rollers, the circumferential edges of said rollers being spaced at different distances from the longitudinal axis of said pipes, said distances decreasing from said longitudinal axis proceeding downstream along said helical thread, said rollers each being rotatable about an individual axis, all of said rollers being carried by a carrier which undergoes rotation about said longitudinal axis.

14. Apparatus according to claim 13, wherein said means for forming said outer pipe over and concentric with said inner pipe includes means for extruding said outer pipe over said inner pipe, said extrusion means including an output die downstream of which said outer pipe comes in contact with said inner pipe, said mold means being located downstream of said location at which said extruded outer pipe makes contact with said inner pipe, means for varying the downstream spacing of said mold means from said output die, and means for exhausting trapped air between said inner and outer pipes downstream of said output die.

15. Apparatus according to claim 13, including means for varying said distances by which said circumferential edges of said rollers are spaced from said longitudinal axis of said pipes.

16. Apparatus for producing a double-walled pipe of thermoplastic material comprising means for forming an outer pipe of thermoplastic material over and concentric with an inner pipe of thermoplastic material, and mold means rotating about the longitudinal axis of said pipes for forming said outer pipe into the shape of a helical thread about the outer surface of said inner pipe, wherein said means for forming said outer pipe over and concentric with said inner pipe includes means for extruding said outer pipe over said inner pipe, said extrusion means including an output die downstream of which said outer pipe comes in contact with said inner pipe, in which said mold means is located downstream of said location at which said extruded outer pipe makes contact with said inner pipe, and means for varying the downstream spacing of said mold means from said output die.

* * * * *